United States Patent [19]
Zuckerbrod et al.

[11] 4,448,856
[45] May 15, 1984

[54] BATTERY AND FUEL CELL ELECTRODES CONTAINING STAINLESS STEEL CHARGING ADDITIVE

[75] Inventors: David Zuckerbrod, Pittsburgh; Ann Gibney, Monroeville, both of Pa.

[73] Assignee: U.S. Department of Energy, Washington, D.C.

[21] Appl. No.: 474,933

[22] Filed: Mar. 14, 1983

[51] Int. Cl.$^3$ .............................................. H01M 4/96
[52] U.S. Cl. ........................................ 429/27; 429/44
[58] Field of Search ................ 429/27, 40, 44, 45, 429/42

[56] References Cited

U.S. PATENT DOCUMENTS

| | | | |
|---|---|---|---|
| 3,423,247 | 1/1969 | Darland et al. | 429/40 |
| 3,977,901 | 8/1976 | Buzzelli | 429/27 |
| 4,341,848 | 7/1982 | Liu | 429/27 |

*Primary Examiner*—Donald L. Walton
*Attorney, Agent, or Firm*—D. P. Cillo

[57] ABSTRACT

An electrode for use in electrochemical energy cells is made, comprising a hydrophilic layer and a hydrophobic layer, where the hydrophilic layer comprises a hydrophilic composite which includes:
(i) carbon particles;
(ii) stainless steel particles;
(iii) a nonwetting agent; and
(iv) a catalyst, where at least one current collector contacts said composite.

10 Claims, 6 Drawing Figures

BATTERY AND FUEL CELL ELECTRODES CONTAINING STAINLESS STEEL CHARGING ADDITIVE

GOVERNMENT CONTRACT

This invention was made or conceived in the course of or under Subcontract 7335709 of Contract No. W-7405-ENG-48 with the U.S. Government as represented by the Department of Energy.

BACKGROUND OF THE INVENTION

Bifunctional air or oxygen depolarization cells are generally well known in the art. Electro-chemical cells of this type include a gas diffusion electrode capable of generating electricity by electro-chemically combining an oxidizable reactant with a reducible reactant. Generally, these electro-chemical cells are comprised of spaced apart electrodes ionically connected by an electrolyte.

Illustrative of these types of cells and electrodes is the teaching of Buzzelli, U.S. Pat. No. 3,977,901. In that patent, particular types of low surface area carbon black materials were used to help solve problems of electrolyte flooding. Other components used in the electrodes of that patent included 0.5 to 4 parts, per 1 part carbon, of an oxygen evolution material, such as $WS_2$ or $WC$, and effective amounts of both a bonding/nonwetting agent and a catalyst for decomposition of perhydroxides, such as silver.

The Buzzelli electrodes were found to have third cycle charging potentials of about 550 mV. to 585 mV., vs. a Hg/HgO reference electrode, achieved by using major amounts of oxygen evolution material, adding substantially to the cost and weight of the electrode. Liu et al., in U.S. Pat. No. 4,341,848, recognized the desirability of lowering this charging voltage, to conserve energy, reducing the amount of silver catalyst that had heretofore dissolved in the electrolyte, and lowering the cost and weight of the above-described types of electrodes.

Liu et al., in the above mentioned patent, substituted ground, elemental sponge iron, formed by thermally reducing $Fe_2O_3$ to $Fe°$ in a hydrogen gas atmosphere at about 750° C., for 50% to 100% of the oxygen evolution material of the Buzzelli electrode. Liu et al. also included a metal sulfide as a silver protection additive. However, the elemental sponge iron could oxidize upon storage, and so had a short shelf life, and could corrode during cell operation. The sponge iron formation also required expensive equipment and expenditure of large amounts of energy. Additionally, while the Liu et al. electrodes had low third cycle charging potentials of about 510 mV. to 575 mV. vs. a Hg/HgO reference electrode, their stability and cycle life could be improved. What is needed is an active electrode material having a long shelf life, and which will provide low charging potentials, minimal electrolyte flooding, and up to 500 cycles of steady performance life.

SUMMARY OF THE INVENTION

The above needs have been met and the above problems solved, by providing a novel electrode for use in electrochemical energy cells, such as, either a metal/air battery, or a low temperature alkaline fuel cell. Generally, the electrode of the present invention includes a hydrophilic layer, comprising a current collector inert to electrolyte, intimately contacted by a stainless-steel-containing hydrophilic active material. A hydrophobic layer can then be press bonded to the hydrophilic layer.

The components for the active hydrophilic material of the electrode are mixed together in a weight ratio of: about 1 part by weight of carbon, having a total surface area of from about 30 to about 1,500 sq. meters/gram, where at least about 50 wt.% of the carbon has a low total surface area of from about 30 to about 300 sq. meters/gram; about 0.2 to about 1 part of stainless steel particles having a particle size range of from about 25 microns to about 420 microns diameter; an effective amount, usually about 0.01 to about 1.0 part by weight, of suitable catalyst; when silver is used as a catalyst, about 0.01 to about 1 part of a metal sulfide, preferably nickel sulfide, as a silver protection additive; and an amount of nonwetting agent effective to bond the other components together and help prevent electrolyte flooding, usually about 0.15 to about 1 part by weight, as powder having a preferred particle size range of from about 0.2 to about 40 microns. As an initial step, if silver is to be used as the catalyst, the carbon particles are silverized by precipitating Ag on the carbon, for example, via the addition of $AgNO_3$ to an aqueous slurry of carbon in the presence of hydrazine ($NH_2NH_2$).

To this mixture a sufficient amount of an aqueous dispersion of a fluorinated polymeric binder is added to provide a material having a paste-like consistency. This paste can then be applied to a current collector by any suitable means, before or after air drying or baking. The hydrophilic layer can then be bonded to a layer of hydrophobic material that is impervious to the electrolyte, but capable of permitting air and oxygen diffusion therethrough.

The electrode of this invention is lightweight and no more expensive than prior art electrodes, because powdered, commercial, ingot stainless steel can be used, eliminating expensive elemental iron production methods. Additionally, the stainless steel particles provide an outstanding porosity effect, have an almost infinite shelf life, and minimize corrosion during cell operation. The electrode of this invention, used as a bifunctional air electrode in an electrochemical cell, such as an iron-air battery, maintains a proper balance of electrolyte permeability, virtually eliminating electrolyte flooding, and allows third cycle charging potentials of about 525 mV. to 585 mV. vs. a Hg/HgO reference electrode. Additionally, up to about 500 cycles of steady performance life can be achieved, in part due to the corrosion-resistant nature of the stainless steel additive. Such electrodes are useful in a variety of metal-air batteries operating at from 25° C. to 45° C., and are also useful as alkaline fuel cell cathodes, in a fuel cell operating at atmospheric pressures and from about 60° C. to 90° C.

BRIEF DESCRIPTION OF THE DRAWINGS

For a better understanding of the invention, reference may be made to the preferred embodiments exemplary of the invention, shown in the accompanying drawings, in which.

DESCRIPTION OF THE PREFERRED EMBODIMENTS

Figure 1:
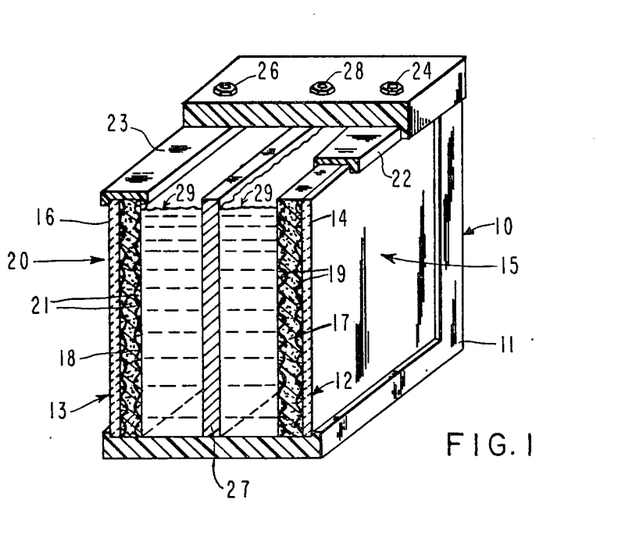
FIG. 1 is an isometric view in partial section, of one type of an air/metal battery, utilizing the electrode of the present invention.

With reference to FIG. 1, battery 10 is a general representation of metal/air cells of the present invention employing bifunctional air electrodes. Metal/air cell 10 includes a casing 11 for support of the air electrode and metal electrode as well as the electrolyte. Preferably, casing 11 is fabricated from ABS plastic or other non-conducting material that is stable or resistant to the electrolyte and reaction products, typically oxygen and hydrogen. Cell 10 comprises a pair of air electrodes 12 and 13 each having an outer hydrophobic layer 14 and 16, respectively, each of which is in contact with the atmosphere or other source of air or oxygen, shown as 15 and 20. Air electrodes 12 and 13 also include hydrophilic layers 17 and 18, respectively including metal current collectors 19 and 21. Electrodes 12 and 13 are framed in frames 22 and 23, preferably made from ABS plastic and having electrical leads 24 and 26, respectively. Although not shown, hydrophilic layers 17 and 18 can be split up to provide a plurality of layers, usually a maximum of six, each usually with its own current collector.

Metal/air cell 10 includes a metal electrode 27, fabricated from iron, cadmium, zinc, aluminum, or the like material, preferably iron, spaced between air electrodes 12 and 13 and including electrical lead 28. Metal/air cell 10 also includes an electrolyte 29 between and in contact with metal electrode 27 and air electrodes 12 and 13, respectively. Electrolyte 29 is an alkali hydroxide, such as sodium hydroxide, lithium hydroxide, or preferably potassium hydroxide. Electrolyte mixtures can also be used. A low temperature alkaline fuel cell could have a very similar construction. In such a fuel cell application, electrode 27 would be removed, electrodes 12 and 13 would be moved closer together, and air 15 would be fed in one side while a suitable fuel, such as hydrogen gas, would be substituted for air as source 20. The electrode described above as an air electrode could be used opposite and spaced apart from the fuel electrode with alkali hydroxide electrolyte therebetween. In most instances the fuel electrode would contain a catalyst other than silver.

Figure 2:
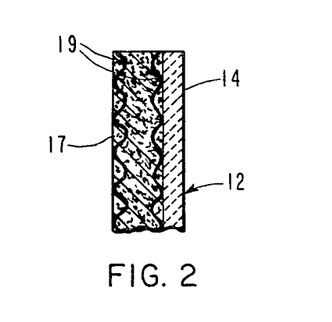
FIG. 2 is an enlarged sectional elevation of one embodiment of the electrode of the present invention, illustrating the various hydrophilic, hydrophobic and current collector components.

With reference to FIG. 2, the electrode 12 is shown with hydrophilic layer 17, and hydrophobic layer 14 pressed and laminated thereto. Current collectors 19 are intimately contacted by and generally formed into hydrophilic layer 17, and are adapted for electrical connection to the circuit. In the present invention, the hydrophilic layer is about 5 to 100 mils and preferably about 10 to 50 mils in thickness and the hydrophobic layer is about 5 to 50 mils thick, for either the metal/air cell or the alkaline fuel cell embodiment.

Hydrophilic layers 17 and 18 comprise a pressed composite of four or five material components. This hydrophilic composite must include a low surface area oxygen absorption and reduction material such as carbon black. Preferably, the carbon comprises discrete particles in a chain like structure, such as Shawinigan acetylene black, having a low total surface area of about 30 to about 300 square meters per gram, as described in U.S. Pat. No. 3,977,901. Unactivated acetylene black carbon, having a surface area of about 70 sq. meters/gram, and a particle size diameter range of from about 0.005 to about 0.13 micron, is particularly effective. The carbon also may comprise a mixture of low surface area acetylene black carbon, and, for example, furnace type carbon black comprising discrete particles having a total surface area of from about 80 to about 1,500 square meters per gram. The low total surface area carbon, such as acetylene black, must comprise from about 50 wt.% to 100 wt.%, preferably from about 75 wt.% to 100 wt.% of the carbon used. The carbon also can serve as a surface for the silver, platinum or other suitable catalyst, depending on electrode application, which can be applied to the carbon.

The term "total surface area" means the total external plus internal area/gram. The porous nature of carbon excludes surface area measurement by microscopic examination, which would give only the external surface. Consequently, indirect methods are used, which include measurements based on absorption isotherms, such as the standard method of Burnauer, Emmett and Teller (BET), or mercury intrusion porosity measurements.

With reference again to FIG. 2, in the electrode 12 shown, the gas penetrates by diffusion to a three phase zone which is a narrow, particularly electrochemically active zone, where the $O_2$, liquid electrolyte and solid carbon particles meet. A catalyst is usually also present. Useful catalysts for both metal/air cells and alkaline fuel cells include at least one of nickel spinel; nickel perovskites; iron, nickel or cobalt macrocyclics; and silver, which is preferred for metal/air cells. Additionally, platinum and platinum-ruthenuim can be used for alkaline fuel cell applications. The catalyst is effective for the decomposition of intermediate reaction products, typically perhydroxides.

The essential stainless steel component can be, for example, ground commercial, ingot stainless steel particles that pass through a 40 mesh (U.S. Screen No.) sieve, i.e., up to about 420 microns. To be effective, the lower particle size should be above about 25 microns. The stainless steel powder particles will preferably have an irregular configuration which acts as a very effective abrasive for the bonding/nonwetting agent during mixing, so that a wide variety of pore sizes are formed in the electrode, enabling both electrolyte and gas penetration in the finished, operating electrodes.

The term "stainless steel" is herein defined as containing about 45 wt.% to 88 wt.% iron, about 11 wt.% to 30 wt.% chromium, 0 wt.% to about 20 wt.% nickel, 0 wt.% to about 6 wt.% molybdenum; 0 wt.% to about 3 wt.% manganese; 0 wt.% to about 3 wt.% silicon; and generally under about 1 wt.% carbon. Stainless types: "304" (18 to 20 wt.% Cr; 8 to 10.5 wt.% Ni; and 0.08 wt.% C, with the rest being substantially all iron); "310" (24 to 26 wt.% Cr; 19 to 22 wt.% Ni; and 0.25 wt.% C, with the rest being substantially all iron); and "316" (16 to 18 wt.% Cr; 10 to 14 wt.% Ni; and 0.08 wt.% C, with the rest being substantially all iron) were found to be very useful. The stainless particles minimize corrosive effects, and in the preferred irregular form have a fibrillating effect on the binder, adding to electrode structural integrity.

The stainless steel functions to reduce oxygen evolution overvoltage. The stainless steel provides a porous, irregular surface for effective electrolyte storage, while simultaneously acting as an electron conductor. Due to its preferred irregular particle configuration, it provides a toruous electrolyte penetration path and allows controlled penetration of electrolyte to the metallic current collecting grids, where oxygen is formed on carbon surfaces, thus facilitating the oxygen evolution process. Thus, the use of stainless steel can allow replacement of easily oxidizable element iron, and scarce, expensive, high density oxygen evolution materials, such as WC.

A silver protection additive can also be used when silver is the catalyst used in the hydrophilic layer. Metal sulfides, such as iron sulfide, cobalt sulfide, and preferably nickel sulfide are effective. The $S^{2-}$ is thought to react with the silver to form $Ag_2S$, which is relatively insoluble in alkali hydroxide electrolytes. Other catalyts are inert in such electrolytes and generally present no dissolution problems.

The weight ratios of ingredients for the hydrophilic layer are: 1 part by weight of oxygen absorption/reduction carbon having a surface area of from about 30 sq. meters/gram to about 1,500 sq. meters/gram and a particle size diameter range of from about 0.005 micron to about 0.13 micron, where at least about 50 wt.% of the carbon has a low surface area of from about 30 to about 300 sq. meters/gram; about 0.2 to about 1 part of stainless steel particles having a particle size range of from about 25 microns to about 420 microns, preferably from about 40 microns to about 50 microns; an effective amount, usually about 0.01 to about 1.0 part of a catalyst for decomposition of perhydroxides; when siliver is used as a catalyst, about 0.01 to about 1.0 part of a metal sulfide preferably nickel sulfide as a silver protection additive; and an effective amount, usually about 0.15 to about 1 part, of a bonding/nonwetting agent including at least polytetrafluoroethylene, and having a preferred particle size range of from about 0.2 micron to about 40 microns. The addition range of stainless steel is critical to this invention, under about 0.2 part/1 part carbon can result in a high charging potential, over about 1 part/1 part carbon may cause electrode flooding and add excessive weight to the electrode.

As a first step, if silver is to be used as the catalyst, the carbon particles are silverized by precipitating Ag on the carbon, via the addition of $AgNO_3$ to an aqueous slurry of carbon in the presence of hydrazine ($NH_2NH_2$). This produces colloidal silver particles of about 5 Angstrom to 30 Angstrom units diameter adhering to the carbon particles. The components can then be mixed together with distilled water.

A variety of methods can then be used to form the hydrophilic layer. In the wet-pasting method, the composition is spread over and through an electrode current collector, each current collector preferably formed as an array of nickel or nickel plated steel fibers, such as nickel or steel wool, bonded together generally below the melting point of the fibers, to form a plague with a theoretical density of from about 5% to 15%, i.e. from about 85% to 95% porous, at a thickness of from 10 to 15 mils. In the preform method of forming the air electrode, the paste is dried, and then cold pressed into the current collector at 0.5 to 2 ton/sq. inch. The resulting hydrophilic layer has a preferred thickness of from 10 to 50 mils.

The electrodes of this invention can consist of a single hydrophilic layer, as shown for simplicity's sake in FIG. 2, but more commonly they consist of a plurality, usually two to four hydrophilic layers bonded together.

Hydrophobic layers 14 and 16 can comprise a sheet of porous, unsintered, fibrillated polytetrafluoroethylene alone, or in combination with fluorinated ethylene propylene and carbon particles. Preferably, the hydrophobic layers will comprise porous fluorinated ethylene propylene, polytetrafluoroethylene and carbon particles, where the carbon particles constitute from about 20 wt.% to about 75 wt.% of the hydrophobic layer. While other methods of attaching hydrophobic layers 14 and 16 to hydrophilic layers 17 and 18 are suitable, it is preferred that they be press laminated to the hydrophilic layer, at from 165° C. to 250° C. and 0.5 to 3 ton/sq. inch, during the consolidation step to form the final electrode. They can also be roll laminated, where both layers are first heated at a temperature of about 300° C. for about 10 minutes and then are passed through a two roll mill, where the roll surfaces are maintained at a temperature of about 190° C. with a pressure therebetween of about 25 psi.

These consolidated electrodes are particularly useful in electrochemical energy cells, which can be combined to form metal/air batteries, where the metal electrode can be iron, zinc, cadmium, or aluminum, with alkali hydroxide electrolyte disposed between and contacting the electrodes.

These electrodes can also find use as electrodes in a variety of low temperature alkaline fuel cells, such as fuel cells of the NaOH and KOH variety, both of which are well known in the art. There, a fuel electrode contacts a fuel, such as hydrogen gas and an air electrode contacts air or oxygen, and electrolyte contacts the fuel electrode and air electrode. In most types of such applications, the electrode of this invention can be used as either the fuel electrode, usually with a platinum catalyst, or the air electrode, and the electrolyte, such as potassium hydroxide or sodium hydroxide is disposed between the fuel and the air electrodes.

EXAMPLE 1

Six electrodes were fabricated having different amounts of stainless steel, and using 2 current collectors of nickel fiber construction. One state-of-the-art control electrode was also fabricated. In all cases, initially, dry acetylene carbon black particles, having a BET total surface area of from about 60 to 70 square meters per gram and a particle size diameter of from about 0.005 to about 0.13 micron (sold commercially by Shawinigan Products Corp. under the tradename Shawinigan Black) were mixed with $AgNO_3$ in a wet slurry. Hydrazine was then added to precipitate the silver on the carbon particles. Excess water was then vacuumed off and the paste allowed to air dry for 24 hours and then powdered. Sufficient $AgNO_3$ solution was used to provide about 4.8 mg. silver per 128 mg. carbon, or about 3 to 4 weight percent silver content on the surface of the carbon particles. To this silver catalyzed carbon, the following ingredients were added as shown below in Table 1:

TABLE 1

| Sample | (Carbon + Silver) | | Stainless Steel Type | | NiS | Polytetrafluoroethylene Bonding/ Nonwetting Agent |
|---|---|---|---|---|---|---|
| 1 | 128 mg. | 4.8 mg. | *"304" | 75 mg. | 125 mg. | 67 mg. |
| 2 | 128 mg. | 4.8 mg. | *"304" | 125 mg. | 75 mg. | 67 mg. |
| 3 | 128 mg. | 4.8 mg. | *"310" | 75 mg. | 125 mg. | 67 mg. |
| 4 | 128 mg. | 4.8 mg. | *"310" | 125 mg. | 75 mg. | 67 mg. |
| 5 | 128 mg. | 4.8 mg. | *"316" | 75 mg. | 125 mg. | 67 mg. |
| 6 | 128 mg. | 4.8 mg. | *"316" | 125 mg. | 75 mg. | 67 mg. |
| 7** | 128 mg. | 4.8 mg. | see** | — | 57 mg. | 67 mg. |

*"304" = about: 18-20% Cr; 8-10.5% Ni; 2% Mn; 1% Si; 0.08% C & rest iron (wt. %)
*"310" = about: 24-26% Cr; 19-22% Ni; 2% Mn; 1.5% Si; 0.25% C & rest iron (wt. %)
*"316" = about: 16-18% Cr; 10-14% Ni; 2% Mn; 1% Si; 0.08% C; 2% Mo & rest iron (wt. %)
**comparative control which also contained 57.1 mg. FeWO$_4$ and 85.7 mg. WC coated with 12 wt. % Co in place of stainless steel.

The polytetrafluoroethylene, about 0.2 to 40 micron particle size, in aqueous dispersion, was mixed with the powdered silver catalyzed carbon particles. This material was then air dried on a metal sheet at 50° C. for 24 hours. The stainless steel, about 30 to 150 micron irregular particle size, milled from commercial ingots, and NiS were then added and mixed mechanicall, to provide a uniform distribution, and to provide an active hydrophilic powder material. During the mixing, the stainless steel additionally fibrillated the polytetrafluoroethylene to form a wide variety of pore sizes in the admixture. In Sample 7, FeWO$_4$ and WC coated with 12 wt.% Co were substituted for stainless steel. The particle size range of the active material admixture powder was from about 250 to 600 microns.

These admixtures were spread on diffusion bonded nickel fiber mesh current collectors, having a thickness of from 10 to 15 mils and a porosity of from 85% to 95%, and cold pressed at about 2,500 lb./sq. in., to form a single active layer coating on and at least partially impregnating the current collectors. Total thickness was about 35 mils.

At this point hydrophobic sheets were made by admixing carbon black particles and polytetrafluoroethylene in a mill, to fabrillate the polytetrafluoroethylene; placing another nickel mesh current collector on the hydrophilic active layer; spreading the hydrophobic admixture on top of the second nickel mesh; and then cold pressing the whole composite at 2,500 lb./sq. in. to form electrode structures about 45 mils thick, and similar to that shown in FIG. 2 of the drawings.

These composites were then placed on the platen of a hot bed press and heat- and pressure-consolidated at 6,000 lb./sq. in. and 177° C. for 10 minutes, to provide unitary, consolidated air electrodes about 30 mils thick. The seven consolidated air electrodes were then cemented into ABS plastic holders with 6.45 sq. cm. windows, and mounted in electrochemical half-cells, with about 100 ml. of 25 wt.% aqueous KOH electrolyte at 25° C., and nickel sheet counter electrodes.

Cells were run using unscrubbed air. Potentials were measured relative to a Hg/HgO reference electrode. During the discharge (O$_2$ reduction) mode, electrodes were operated at a current density of 25 mA/cm$^2$ for four hours. Charging was accomplished at a current density of 12.5 mA/cm$^2$, also for four hours. Once a week, electrodes were polarized in the discharge mode over a current density range of from 6.25 to 125 mA/cm$^2$, and in the charge mode of from 1 to 125 mA/cm$^2$. The average measured charging potential for Sample 1 through 6 electrodes after three cycles was 555 mV.

Figure 3:
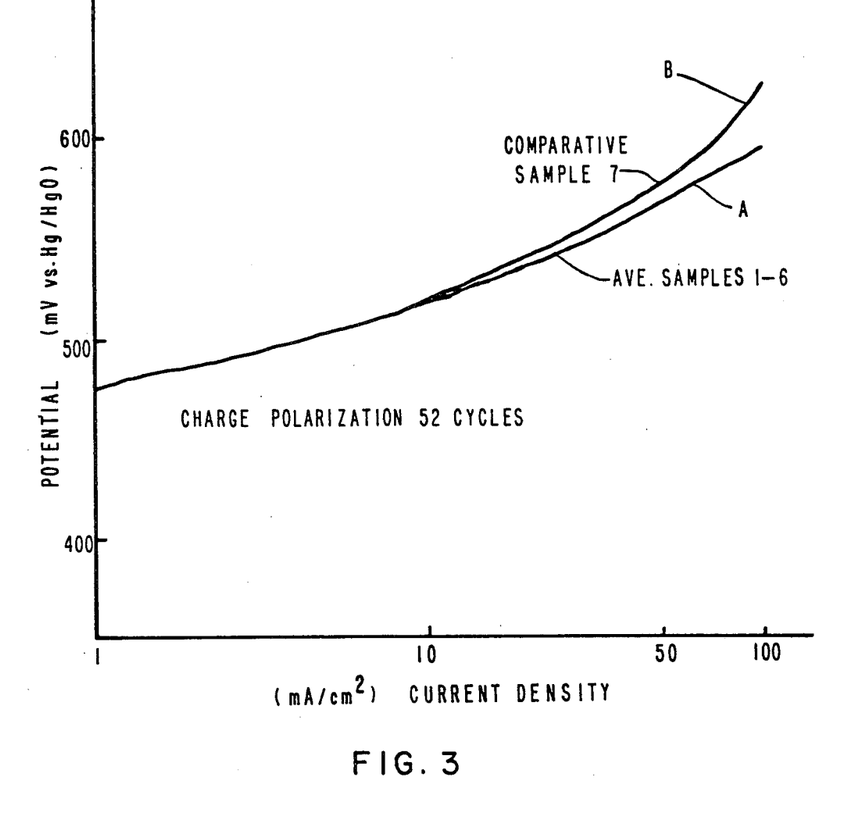
FIG. 3 is a comparative graph showing charge polarization.
Figure 4:
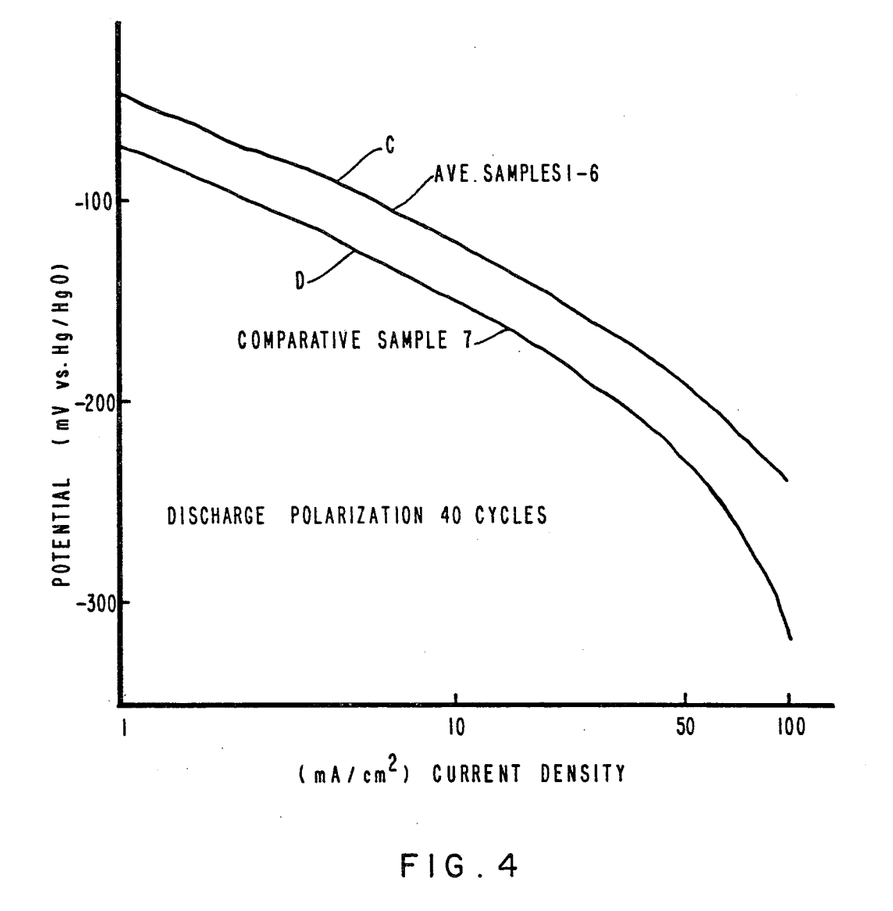
FIG. 4 is a comparative graph showing discharge polarization.
Figure 5:
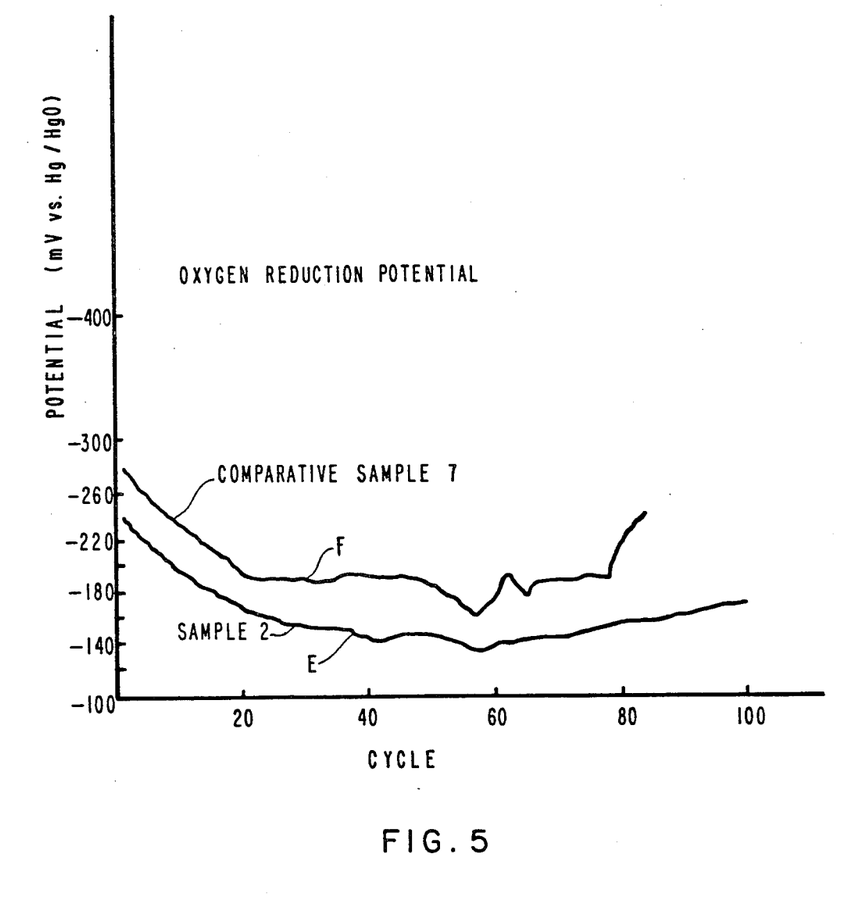
FIG. 5 is a comparative graph showing oxygen reduction potential vs. cycle number.
Figure 6:
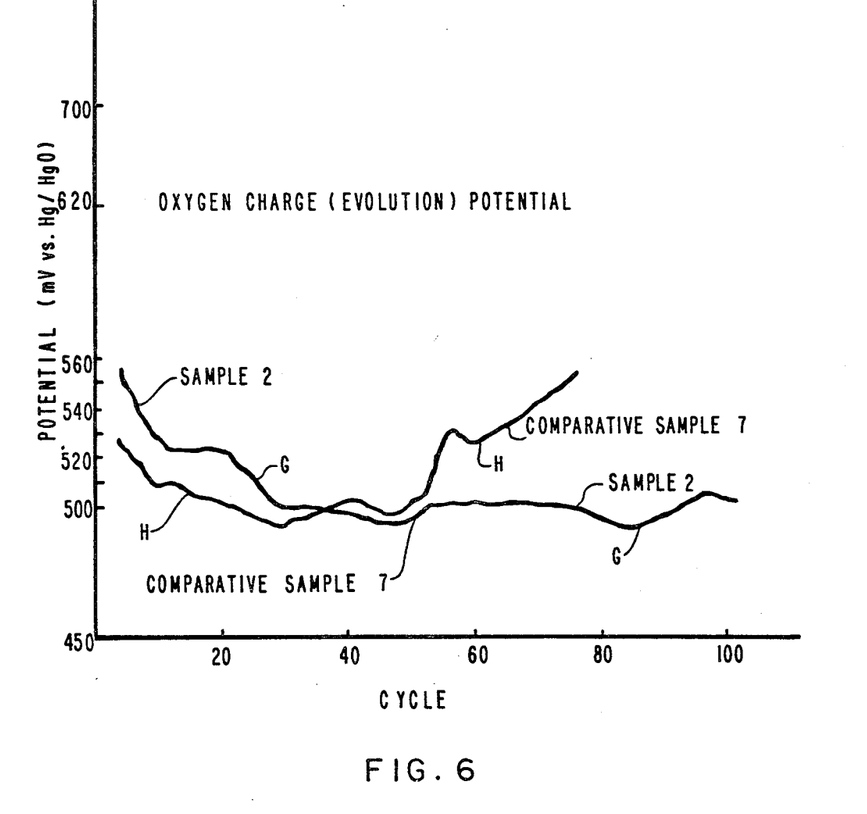
FIG. 6 is a comparative graph showing oxygen charge (evolution) potential vs. cycle number.

Test results showing the charge polarizations of the Sample 1 through 6 electrodes (average value), curve A, vs. the comparative Sample 7 electrode, curve B, after 52 cycles, are shown in FIG. 3 of the drawings; and results showing the discharge polarizations of the Sample 1 through 6 electrodes (average value), curve C, vs. the comparative Sample 7 electrode, curve D, after 40 cycles, are shown in FIG. 4. As can be seen, the slopes in both modes at higher current densities are better for the electrodes of this invention than for the comparative Sample 7. This would indicate more available peak power. FIG. 5 shows a comparison of oxygen reduction potential vs. cycle number for Sample 2, curve E, vs. comparative Sample 7, curve F. FIG. 6 shows a comparison of oxygen evolution potential vs. cycle number for Sample 2, curve G, vs. comparative Sample 7, curve H. As can be seen, the electrode of this invention—Sample 2, has a very stable curve, indicating no major potential changes, electrolyte flooding, or degradation of electrode materials. Samples 1 and 3 through 6 would be expected to provide similar stable behavior.

Sample electrodes containing number "316" stainless steel in amounts similar to Samples 5 and 6 above, but containing four separate hydrophilic layers have provided long life stable operating performance for up to 500 cycles without serious electrode flooding or corrosion.

These long life stability electrodes would provide outstanding electrodes for metal-air batteries similar to that shown in FIG. 1 of the drawings. As described hereinabove, the electrodes of this invention can also be used in low temperature alkaline fuel cell applications.

We claim:

1. An electrode comprising:
A. a hydrophilic layer comprising:
(1) a hydrophilic composite comprising:
  i. 1 part by weight of carbon particles where at least about 50 wt.% of the carbon particles have a total surface area of from about 30 to about 300 sq. meters/gram;
  ii. about 0.2 to about 1 part by weight of stainless steel particles;
  iii. an effective amount of a bonding/nonwetting agent; and
  iv. an effective amount of a catalyst for decomposition of perhydroxides; and
(2) at least one metal current collector contacting said composite to provide a hydrophilic layer, and
B. a hydrophobic layer pressed to said hydrophilic layer.

2. The electrode of claim 1, wherein the current collector is a metal fiber current collector, and the stainless steel particles have a particle size of from about 25 microns to about 420 microns.

3. The electrode of claim 1, wherein said hydrophilic composite is substantially flat, the catalyst is silver, and an effective amount of metal sulfide is included in the hydrophilic composite as a silver protective additive.

4. A metal/air cell comprising a metal electrode selected from the group consisting of iron, zinc, aluminum, and cadmium; at least one air electrode as set forth in claim 1 spaced apart from said metal electrode; and an alkali hydroxide electrolyte in contact with said electrodes.

5. A fuel cell, comprising a fuel electrode, an electrode as set forth in claim 1 spaced apart from said fuel electrode, and an alkali hydroxide electrolyte in contact with said electrodes.

6. An electrode for use in electrochemical energy cells comprising:
A. a hydrophilic layer comprising:
(1) a hydrophilic composite comprising:
  i. 1 part by weight of carbon particles having a total surface area of from about 30 to about 1,500 sq. meters/gram, where at least about 50 wt.% of the carbon particles have a total surface are of from about 30 to about 300 sq. meters/gram;
  ii. about 0.2 to about 1 part by weight of stainless steel particles having a particle size of from about 25 microns to about 420 microns;
  iii. an effective amount of bonding/nonwetting agent including at least polytetrafluoroethylene; and
  iv. an effective amount of a catalyst for decomposition of perhydroxides; and
(2) at least one metal current collector formed into said composite to provide a hydrophilic layer; and
B. A hydrophobic layer pressed to said hydrophilic layer.

7. The electrode of claim 6, wherein the current collector is a meter fiber current collector.

8. The electrode of claim 5, wherein said hydrophilic composite is substantially flat, the catalyst is silver, the silver is deposited on the carbon particles, and an effective amount of metal sulfide is included in the hydrophilic composite as a silver protective additive.

9. A metal/air cell comprising a metal electrode selected from the group consisting of iron, zinc, aluminum, and cadmium; at least one electrode as set forth in claim 6 spaced apart from said metal electrode; and an alkali hydroxide electrolyte in contact with said electrodes.

10. In a metal/air battery comprising a metal electrode selected from the group consisting of iron, zinc, cadmium, and aluminum, at least one air electrode spaced apart from said metal electrode, and an alkali electrolyte in contact with said metal and air electrode, the improvement consisting of the air electrode which comprises:
A. a hydrophobic sheet; and
B. a hydrophilic-active layer laminated to said hydrophobic sheet, said hydrophilic active layer comprising:
  i. 1 part by weight of oxygen absorption/reduction carbon particles having a total surface area of from about 30 to about 1,500 sq. meters/gram, where at least about 50 wt.% of the carbon particles have a total surface area of from about 30 to about 300 sq. meters/gram;
  ii. about 0.2 to about 1 part by weight of stainless steel particles having a particle size of from about 25 microns to about 420 microns;
  iii. an effective amount of bonding/nonwetting agent including at least polytetrafluoroethylene;
  iv. an effective amount of a catalyst for decomposition of perhydroxides; and
C. at least one metal current collector contacting said hydrophilic active layer.

* * * * *